July 3, 1928.
A. MEISSNER
1,675,367
METHOD AND ARRANGEMENT FOR GENERATING OSCILLATIONS
BY TWO-ANODE ELECTRON TUBE
Filed Dec. 15, 1924
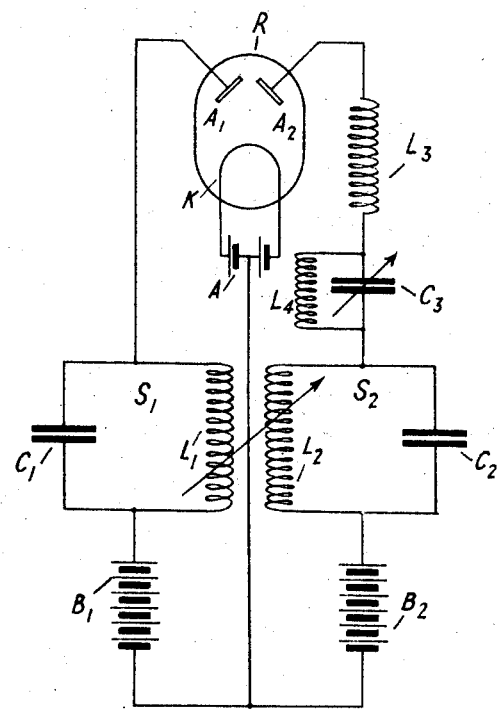
INVENTOR
ALEXANDER MEISSNER
BY
ATTORNEY Patented July 3, 1928.

1,675,367

UNITED STATES PATENT OFFICE.

ALEXANDER MEISSNER, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY.

METHOD AND ARRANGEMENT FOR GENERATING OSCILLATIONS BY TWO-ANODE ELECTRON TUBE.

Application filed December 15, 1924, Serial No. 755,889, and in Germany December 19, 1923.

My invention relates to a method and means for generating oscillations from an electron discharge device, and has for its object to provide such a method and means whereby high frequency oscillations can be effectively and efficiently generated.

Other objects will be apparent from the following description and claims when considered with the accompanying drawing, in which the single figure is a circuit embodying my invention.

Referring to the drawing, the electron discharge tube is denoted by R, its two anodes by $A_1$ and $A_2$, and its filamentary cathode by K. The cathode K is heated by battery A. Each anode, $A_1$ and $A_2$, is connected to the cathode K through the mid-point of battery A by an oscillatory circuit. These oscillatory circuits are denoted by $S_1$ and $S_2$. Circuit $S_1$ is made up of capacitance $C_1$ and $L_1$ connected in parallel, while, similarly, circuit $C_2$ is made up of capacitance $S_2$ and $L_2$ connected in parallel.

Inductance $L_1$ and $L_2$ are adjustably coupled to one another. Direct current sources $B_1$ and $B_2$ are inserted in the connecting wires leading from the cathode K to the anodes $A_1$ and $A_2$. Furthermore, one or both anode-cathode circuits may contain an impedance which may be made up of capacitance $C_3$ and inductance $L_3$ serially connected, $C_3$ being shunted by an inductance $L_4$. The inductance $L_3$, $L_4$ and capacitance $C_3$ are inserted for the purpose of adjusting the phase relationship in the anode, cathode circuit.

The oscillations are generated by an oscillation being generated in the one oscillatory circuit by the process of switching on, and this oscillation also producing an alternating current in the coupled circuit. It can be attained by suitably dimensioning both oscillatory circuits and the impedance $C_3$ $L_3$ that the alternating voltages of both anodes are 180° different in phase. Then the oscillation in the one circuit is maintained by the opposite effect of the other circuit.

The batteries $B_1$ and $B_2$ may be partly or entirely common for both anode-cathode circuits.

Having described my invention, I am entitled to all modifications thereof, as fall fairly within the scope of the following claims:

1. A system for generating electrical oscillations including a thermionic valve comprising a hot cathode and two cold anodes symmetrically spaced with respect to the cathode, an oscillating circuit connected to each anode and the cathode, coupling means for coupling the two circuits, a source of direct current for each of said circuits and phase adjusting means in one of said circuits, of such a value that the alternating potential set up by said oscillatory circuits one one of said anodes is 180° out of phase with respect to the alternating potential set up on the other of said anodes.

2. The method of generating oscillations by means of a vacuum tube having a hot cathode and two symmetrically spaced anodes which consists in connecting an oscillatory circuit including a source of energy to each of said anodes and to said cathode, coupling said oscillatory circuits, and adjusting the phase of one of said circuits to such a value that the alternating potential on one of said anodes is 180° out of phase with the alternating potential on the other of said anodes.

ALEXANDER MEISSNER.

CERTIFICATE OF CORRECTION.

Patent No. 1,675,367.                                                      Granted July 3, 1928, to

ALEXANDER MEISSNER.

It is hereby certified that error appears in the printed specification of the above numbered patent requiring correction as follows: Line 22, for "C sub 2" read "S sub 2" and for "S sub 2" read "C sub 2"; line 24, for the word "Inductance" read "Inductances", and line 66, claim 1, for the word "one" first occurrence read "on"; and that the said Letters Patent should be read with these corrections therein that the same may conform to the record of the case in the Patent Office.

Signed and sealed this 6th day of November, A. D. 1928.

M. J. Moore, (Seal)                                                               Acting Commissioner of Patents.